United States Patent [19]

Bristor et al.

[11] Patent Number: 5,815,712
[45] Date of Patent: Sep. 29, 1998

[54] SYSTEM FOR CONTROLLING FUNCTIONS OF A TARGET APPLICATION USING CONTROLLABLE OBJECTS

[75] Inventors: David M. Bristor, Menlo Park; Brian T. Lewis; Graham Hamilton, both of Palo Alto, all of Calif.

[73] Assignee: Sun Microsystems, Inc., Palo Alto, Calif.

[21] Appl. No.: 897,055

[22] Filed: Jul. 18, 1997

Related U.S. Application Data

[63] Continuation of Ser. No. 339,105, Nov. 14, 1994, abandoned.

[51] Int. Cl.$^6$ ........................................................ G06F 9/44
[52] U.S. Cl. .......................... 395/701; 395/680; 395/683; 345/333; 345/335
[58] Field of Search ........................... 395/701, 702, 395/703, 333, 680, 683; 345/333, 335, 334

[56] References Cited

U.S. PATENT DOCUMENTS

| | | | |
|---|---|---|---|
| 5,327,529 | 7/1994 | Fults et al. | 395/155 |
| 5,416,901 | 5/1995 | Torres | 395/159 |
| 5,432,940 | 7/1995 | Potts et al. | 395/700 |
| 5,438,659 | 8/1995 | Notess et al. | 395/155 |
| 5,475,843 | 12/1995 | Halviatti et al. | 395/700 |
| 5,603,034 | 2/1997 | Swanson | 395/701 |

FOREIGN PATENT DOCUMENTS

A-0 596 591  5/1994  European Pat. Off. .

OTHER PUBLICATIONS

Allan Tuchman, et al., "Run–Time Visualization of Program Data," *Proceedings of the Annual Conference on Visualization*, San Diego, CA, Oct. 22–25, 1991, pp. 255–261.

T. Conlon, et al., "Debugging Tools for Concurrent Logic Programming," *The Computer Journal*, vol. 35, No. 2, Apr. 1992, pp. 157–169.

"Turbovision Programming Guide", Borland International, 1992. pp. 204–235.

*Primary Examiner*—Emmanuel Todd Voeltz
*Assistant Examiner*—Kakali Chaki
*Attorney, Agent, or Firm*—Finnegan, Henderson, Farabow, Garrett & Dunner, L.L.P.

[57] ABSTRACT

A system for providing a user or agent control over functions defined by an object in a target application. The object is a new type of object called a controllable object, which publishes its functions and for use by a control application. When the target application execution is commenced, it generates predefined controllable objects, and then execution of the control application is commenced. The control application obtains a handle on the controllable object, and then is able to set any of a number of predefined values in the controllable object, such as individual variables or parameters, ranges of values, a list of choices from which the user can select, and others. In this way, the user can manipulate, test and optimize the target application even during its execution, by virtue of the pre-programmed controllable object functions. With a standard data structure for the data items involved and a standard controllable object set of functions, a generic control program can be used to interact with any new target application utilizing the standards, and the target application and control program do not need any other information about one another in advance, providing portable test interaction with any target application using a single control application.

10 Claims, 5 Drawing Sheets

FIG. 3A
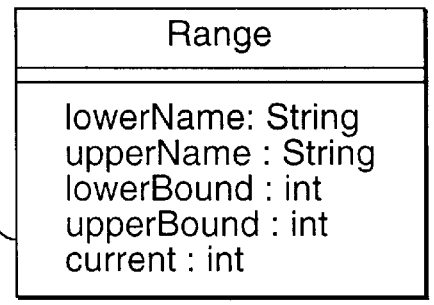
FIG. 3B
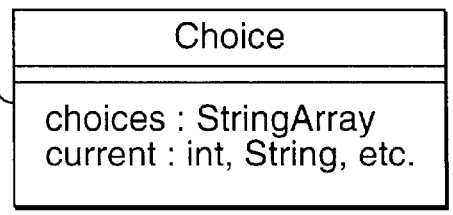
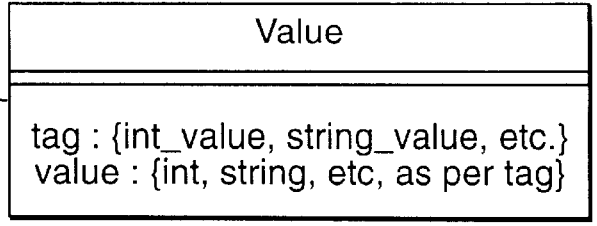
FIG. 3C
FIG. 3D

SYSTEM FOR CONTROLLING FUNCTIONS OF A TARGET APPLICATION USING CONTROLLABLE OBJECTS

This application is a continuation of application Ser. No. 08/339,105, filed Nov. 14, 1994, now abandoned.

BACKGROUND OF THE INVENTION

The invention relates to debugging and optimization of applications, and is applicable to a number of related fields, including object-oriented programming, distributed computing systems, and client-server computing. The invention relates particularly to a system that provides a client program the ability to alter parameters or values of a controllable object in a target application while the target application is executing, to effect tests on the target application in real time.

As a software application is created, it is important to be able to understand and test characteristics of its operation that will not necessarily be visible to end users. Often, it will be desirable to optimize the internal features of the application while the program is running, to carry out tests to determine which parameter values within the program maximize its performance.

There is thus a need for human users or programs to be able to control in real time the operation or behavior of both system and application software. This is done to tune and debug software components, to enable or disable features, to change operating modes or parameters, to invoke special operations, to set limits of operational boundaries, etc. The particulars which programmers must control in these cases are often outside the bounds of the program's normal interfaces, and so must not be exposed through these interfaces. Conventional mechanisms for controlling software have included:

(a) programs with no explicit control, so that the software must be controlled by running it under control of a debugger, by which means the program can be stopped at arbitrary points, values in the application changed, and then the software let run again;

(b) software-based mechanisms that require rebuilding the software components to include new, specially written control code, or to enable control code that had been previously written; and (c) specialized hardware devices attached to the computer system on which the target program is run, which can interrupt the running program, allow one to change values in the program, and then allow the program to continue execution.

Despite the need for programmers to control software programs, few actually make this possible, requiring programmers to resort to method (a) described above. However, choice of method (a) may adversely affect operation of the target program, because use of a debugger with a target program may impose a different operating environment on the target program, perturbing the application's normal operation. So while the target program can in principle be controlled, the effects of such control can bias the execution of the application, such that results of tests cannot reliably be validated. Moreover, in some cases it is impossible to run a program under control of a debugger; this is particularly true of programs that form part of a distributed system.

Method (b) is occasionally used, but it too can adversely impact operation of the target program. Special code must be written for each target application, along with special user interfaces for the programmer to affect control of the target, all of which is time-consuming and expensive. Furthermore, because these user interfaces are not designed for user by end users (but only by the programmers), very little attention is given to their quality, resulting in interfaces which can be difficult to use, even for the programmer who built them. In addition, target program must be compiled specially to either enable or disable the control functionality.

Specially written control code also presents the obstacle that both the control code and the code providing a user interface to the control code must be maintained as the program evolves. Often when a program is modified, the control support is not modified as necessary, because the original programmer is no longer available.

Another disadvantage to approach (b) is that each application contains its own user interface code, and this code cannot be shared between different target applications—unless this user interface code is placed in a shared library. Even when the interface code is placed in a shared library, all code created for the target application which invokes the user interface library code is usable only by that particular target application. Thus, such control interface code is not in general portable, requiring new coding for each target application, thereby driving up both the time and the cost of development of the application.

Method (c) is rarely used, as it is extremely expensive and has very limited applicability. Only those functions which are built into the hardware itself may be controlled, and a program can be controlled by method (c) only at the lowest level of detail. Usually these aspects of program operation are not those which are of interest to the program's developer.

Applications change over their lifetime, and as they do so, the original experiments may have to be re-run. The special purpose software that supports them may have to be updated as well. Sometimes new experiments need to be done, requiring more special-purpose software to be written to support these experiments. Sometimes the new experiments do not fit in well with the earlier software, and an entirely new set of special purpose software to support these new experiments must be written. The previous approaches do not solve these problems.

One approach to these problems is ACE (Application Construction Environment). ACE provides a means whereby information in an application can be presented to a user, without requiring that the programmer make detailed decisions about the appearance of the user interface that controls that information. Conventionally, it is written in and requires the use of C++. The application program and user interface reside in the same address space, and ACE thus does not provide for the user interface running in one address space and the application program in another. Furthermore, because of its tight coupling between application and presentation, only one interface at a time can be presented, even if more than one has been created. For more information, see *ACE: Building Interactive Graphical Applications*, by Johnson, Nardi, Zarmer, and Miller, in Communications of the ACM, April 1993, Vol. 36, No. 4, pp 41–55.

SUMMARY OF THE INVENTION

The method and apparatus of the invention provide a new type of object which shall be called a "controllable object". A controllable object provides a standardized way for a target application to allow itself to be controlled by a control program, without either needing to know in advance (i.e. at the time of coding either one) about the existence of the other. Furthermore, the control program does not need to know what controls will be made available by the target application; the control program is generic in this sense. The target application and control application may be in the same or different address spaces.

The description to or interface of a controllable object provides an operation that allows controls particular to the target application to be retrieved, and another operation that allows one of the controls to be invoked; this invocation may, for instance, include a value which the target application should consider as the new value for the control. Each control in the list of controls has a name by which it can be recognized and described, and each control also describes the type of the data which it represents. The value of the data may also accompany the control.

Some types of controls may be included in the provided list of controls not for values to be presented to the user, but to describe how a control program that presents a graphic display of controls can arrange the controls on a computer screen for the best logical arrangement.

Different target applications can provide their own controllable objects—that is, they can provide controllable objects specific to themselves, such that their lists of controls contain controls different from other target applications. The same control program can be used with all these target applications, though the computer system will run one instance of the control program for each separately running instance of a target application. However, the computer system can run more than one control program for a particular target application.

The target applications and control programs do not need to be written in the same programming language.

The target application and control program may be one and the same program. Alternatively, the target applications and control programs can be executed on different machines, if the machines are part of a distributed system that allows invocations in one address space to be forwarded to an object in another address space (on the same machine or a different machine), and if the results of that invocation can be returned to the invoker. An advantage of this approach is that, once the target application is released, support service workers from the application developer can continue to control the target application, even though it's in its final release form. This cannot be done using, e.g., method (a) described in the Background of the Invention, above.

In the system of the invention, the amount of code that the target application must have that is specific to the controllable object itself is very small. All the user interface work is done in the control application itself. This means that all applications being controlled by a particular control program will be sharing the same user interface code. (The only difference between them will be the small amount of code used to implement getControls and setControl as described below.)

In a prior patent application, applicant herein described a system for obtaining values of parameters in a target application by reference to objects in the application. See Method and Apparatus for a Real-Time Data Collection and Display System, U.S. patent application Ser. No. 07/958,634 of B. Lewis and G. Hamilton (and assigned to Sun Microsystems, Inc.), filed Oct. 9, 1992, now abandoned, which is incorporate herein by reference. The present invention can use a similar approach to obtain access to objects of the target application (e.g. via the microkernel of the operating system upon which the target application is executing), but goes further than the '634 patent application: instead of just retrieving values, a system has now been developed for interacting with objects of the target application, and actually controlling parameters at the will of the user to test and manipulate the target application.

BRIEF DESCRIPTION OF THE DRAWINGS

FIGS. 3A–3D and 4A–4C show data structures for use in the present invention.

DESCRIPTION OF THE PREFERRED EMBODIMENTS

Figure 1:
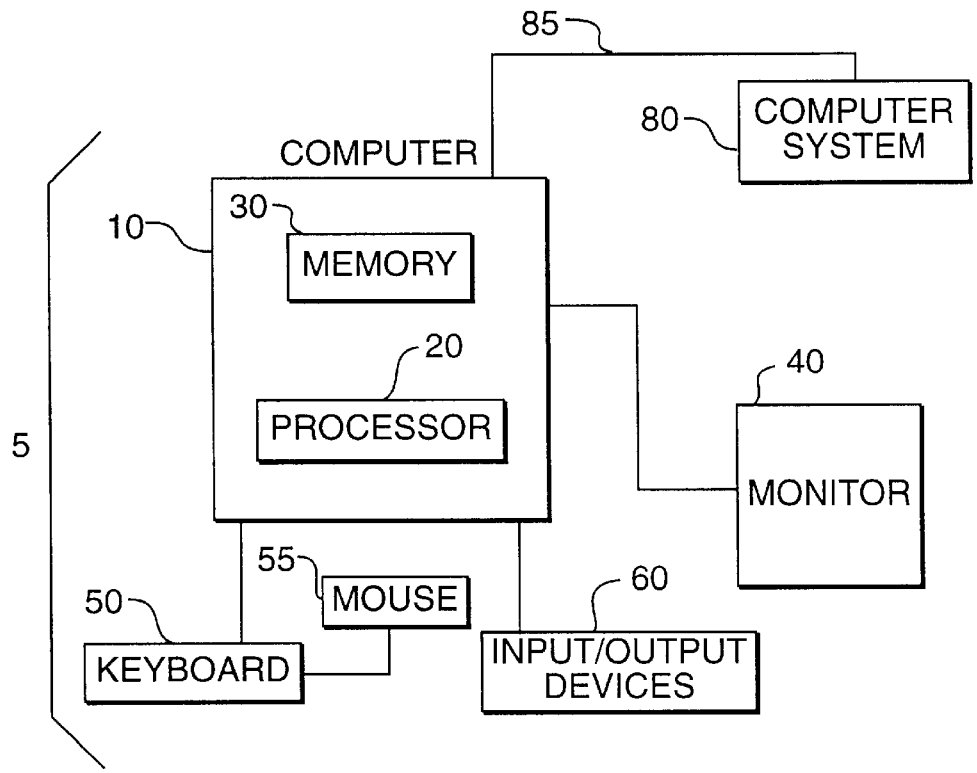
FIG. 1 is a block diagram illustrating a computing environment in connection with which the present invention may be used.

The present invention is best implemented by the use of a computer system 5, shown in FIG. 1, including a computer 10 having a processor 20 and a memory 30. A user may input information by means of a keyboard 50 and mouse 55, and may read information on a display 40 coupled to the processor, and other conventional input and output devices 60 may be provided. Another computer system 80, also including a processor, memory and input/output devices (not separately shown) may be connected to computer system 5 via a network connection 85. The systems 5 and 80 together may constitute a distributed processing network.

A target application 90 (see FIG. 2), which a programmer or end user wishes to test, debug or otherwise control in a particular manner, is stored in the memory 30 for execution on the processor 20. The target application includes instructions stored in the memory 30, and comprises at least one controllable object 95. A control application 100 (see FIG. 2) is stored either in the memory 30 or in the memory of the computer system 80. Thus, the control (e.g. optimization) of the target program can be effected either from the same processor on which the target program executes—stored within the same memory 30 and even the same address space as the target program 90—or may be stored in a separate memory, and even be executed by another processor networked with that processor.

GENERAL OPERATION

Following is a general description of the use of the controllable object 90 to effect the features of the invention. This is followed by a specific description, in conjunction with the block diagrams and flow chart of the figures, of the structure and operation of the invention.

The control application 100 is used to effect user-selectable controls of the target application 80 via its controllable object(s) 90. A controllable object is a type of object which has been designed for the system of the present invention, upon which two operations are possible: one returns a list of controls, and the other allows a control to be set. A control is a named value, where the value indicates the type of control available.

When a programmer defines an object and wishes to make it controllable, the controllable characteristic can be provided by a number of ways. One way is to inherit from a type (or subtype) which shall be referred to herein as "controllable_object", and then implement two object methods (or object functions), which shall be referred to herein as "getControls" and "setControl". Another way is to define a separate object that exists solely to present the controllable nature of the primary object; this second object must then inherit from controllable_object, and maintain a connection between itself and the primary object.

Having defined an object that inherits from controllable_object, the programmer must create bodies for the functions getControls and setControl. The getControls function must return a list of controls, each control of which represents part of the object that the programmer wants to control. Each control has a value that must be chosen appropriately for the part of the object being controlled. Most controls will be supplied with an initial value, which will be presented by the control program. Each control has a name by which the control will be known in the control program.

The setControl function accepts a name and a setting, with the name specifying a predefined object control to which the setting applies. (The name is one of those returned by the getControl function.) The code for this function attempts to match the name with one of those controls given out in the list by getControls. If no match is found, this function takes no action (and if desired, it could provide an error message). If a match is found, the setting is inspected to determine whether the type of value it represents is applicable to the type of control indicated by the supplied name. If this is the case, then the code will affect some portion of the object being controlled, as determined the control itself and its accompanying data.

The controllable_object subtype described above is generated by code written by a programmer in advance. Once created, the controllable object must be put somewhere in the computer system so that a control program can locate and access it. Generally, it will be incorporated into the target program to be tested, but it may be located elsewhere if desired.

In addition to the controllable object(s), the system on the other hand uses a generic control program to control that (those) controllable object(s). The control program includes the following sections (or program modules) of the control program:

(1) a controllable object acquisition section;
(2) a section that obtains the controls from a controllable object;
(3) a section that presents the controls to the client of the control program itself;
(4) a section that allows the client to set a control; and
(5) a section that invokes setControl on the controllable object.

Each of these is discussed below.

(1) Acquisition of a controllable object. The control program first determines which object is to be controlled. This may be given as a name parameter when the control program is first run, in which case the name is looked up, and an attempt is then made to discern whether the name truly is that of a controllable object. If so, a reference is maintained to the controllable object and the control program proceed to the next section.

If the supplied name is not determined to be that of a controllable object, the control program then cannot use controllable object functions to control the target application (though there may be other means of controlling the target application, not part of the present invention).

Alternatively, the control program could be invoked directly with a controllable object, or the control program may be provided with the capability of finding controllable objects within a given system, and letting a client select one or more of the located controllable objects. In all cases, the control program retains a reference to the controllable object and proceeds to the next section (i.e. section 2 listed above). Finally, the control program may be a non-generic control program which controls aspects of itself; in this case the programming language's own namespace may be used to locate the controllable object.

(2) Obtaining controls. This section invokes getControls on the controllable object. The controllable object will return a list of controls. Each control has a name and a typed value, which are made available to the control program's clients.

(3) Presenting the controls. This section of the control program examines the list of controls returned by the invocation of getControls on the controllable object. In a graphical user interface, this can be by a display of the individual controls with their names and current values. In a command-line driven interface, the user may be able to query the control program for the names and types and current values of controls. In either case, the type of the value associated with the control can be used as an indication of how the control can be presented.

A control program that doesn't present a user interface will not require this section, as it will examine the controls directly as obtained by getControls on the controllable object as in the previous section.

Some controls given by the application program in the list of controls may serve only to express how other controls should be presented on screen, e.g. for logical or physical groupings.

(4) Allowing the client to change a control. This section provides a means whereby the control program's client can set a control. In a graphical user interface, this can be by typing in new values, choosing elements from a menu, pressing buttons, and by other actions available in conventional graphical user interfaces. In a command-line driven interface, this can be by letting the user input a command that allows a control to be given a new value.

In control programs without user interfaces, the control program can operate directly on the controllable object's interface to set controls, as discussed in the next section. New values may thus be provided either by a user or by the control program itself, e.g. by an agent of the control program.

(5) Setting a control. Once a new value for the controllable object's identified parameter (i.e. the one selected by the user or agent) has been provided by the user or agent, the control program will create a "setting" object with the new value and invoke setControl on the controllable object, giving the name of the control set and the setting object as arguments for the invocation. After the setControl operation is complete, the control program may end, or may continue execution as in section 4 above, i.e. to allow the user or agent to change additional controls.

An example of a likely use of the system of the invention involves the use of "garbage collection" of the target application, i.e. the freeing up of memory that no longer stores actively used data. Essentially every application has a garbage collection feature. A user may wish to test the target application's garbage collection feature, by:

setting the frequency (e.g. hourly, every 5 minutes, etc.) that the application collects garbage by entering a frequency value; or selecting one of a number of frequency values (see preceding) presented by the controllable object;

setting the amount of memory use (e.g. 50%, 75%, etc.) that must be reached before garbage collection will take place; or selecting a frequency such as the above from a list of choices presented by the controllable object; or commanding the target application to collect garbage immediately.

Execution of the Control Application

The system of the invention, utilizing controllable objects, may be used in many different ways. The user is provided with access to the controllable object, which gives the user the capability of manipulating the state of the target program containing the controllable object, while the target program is executing. This may be done by setting values of parameters, selecting from a list of actions to be taken, selecting a value from a range of values, and in other manners that may be desired by the programmer or user.

The following description refers to FIGS. 3–6. FIGS. 3A, 3B and 3D show data structures defined by the target application, and FIG. 3C shows a variable "Layout" with possible values as shown.

Figure 4A:
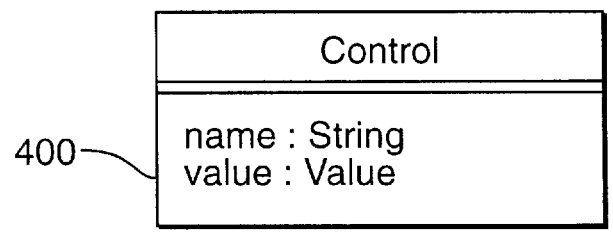
Figure 4B:
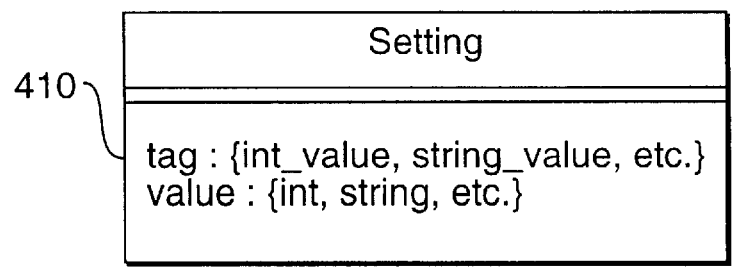

FIG. 4A is also a data structure "Control" defined by the target program, and FIG. 4B shows a data structure "Setting" defined by the control program.

Figure 4C:
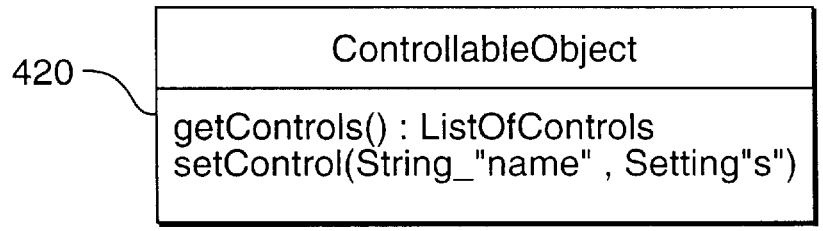

FIG. 4C shows the definition of a controllable object according to the invention, residing in both the target application and the control application.

It will be clear to those skilled at object-oriented programming how to implement each of the data structures controllable objects defined herein; the actual coding is straightforward, given the structures and method shown in FIGS. 3–6.

Figure 6A:
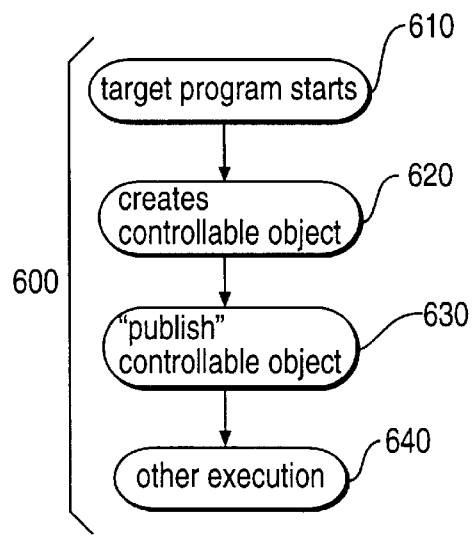
FIGS. 6A–6B are flow charts illustrating the method of the invention.
Figure 6B:
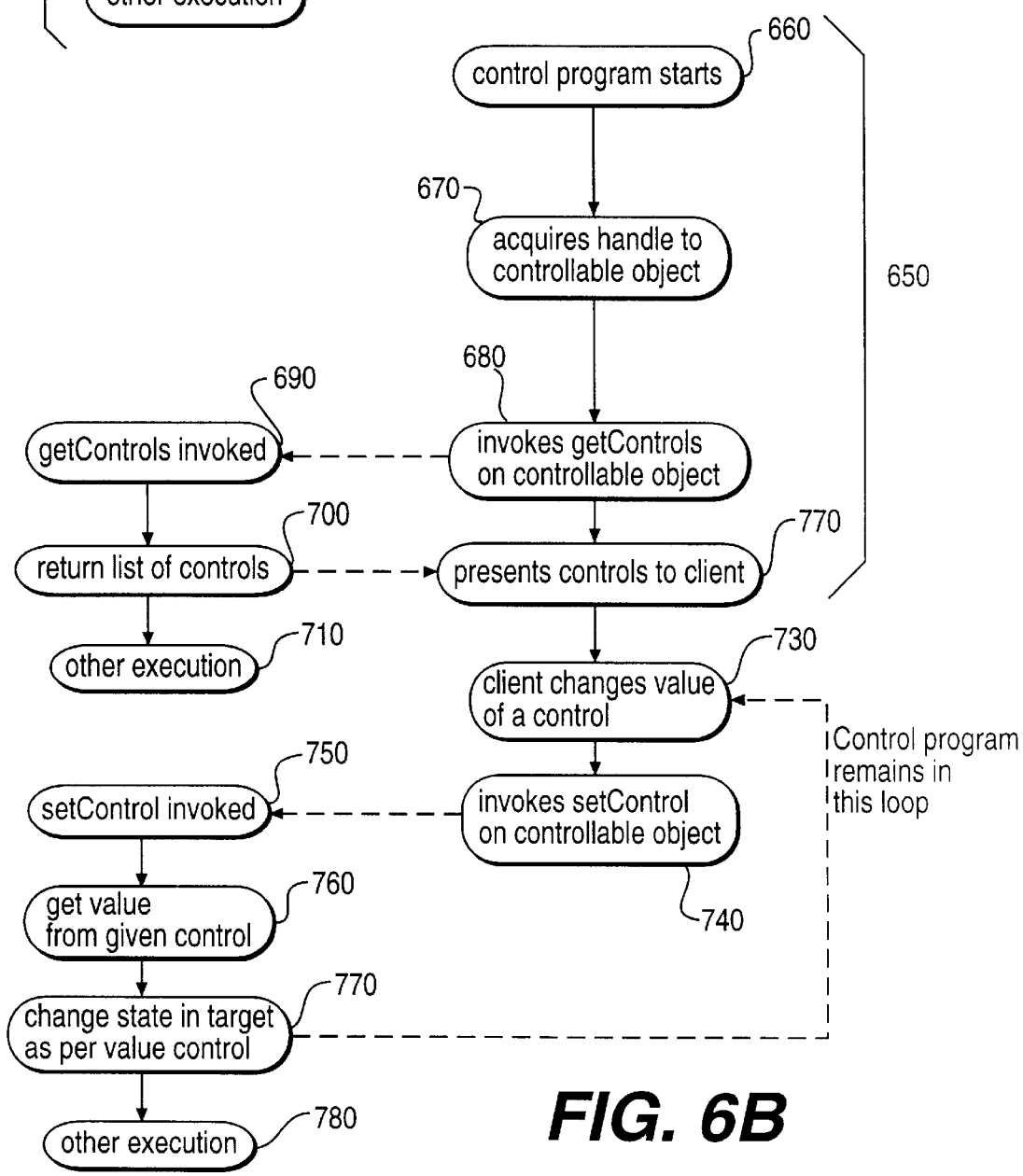

FIGS. 6A–6B illustrate the method of the invention, and are vertically aligned such that operations of the target application appear in the left column, while operations of the control application appear in the right column. In FIG. 6A, the flow chart 600 depicts execution of the target application: at step 610, execution is commenced, and at step 620 the target application generates one or more predefined (preprogrammed) controllable objects. The controllable object is "published" at box 630—i.e., its name is made available to a control program (preferably by means of a name registry, as described above). Further execution (not necessarily having directly to do with the controllable object (s)) is carried out at step 640.

FIG. 6B includes a flow chart 650 showing execution of a control application 100 of the invention to effect control of the target application 80 (see FIG. 1). Execution is commenced at box (or step) 660, and at box 670, a handle (i.e. reference) is acquired to a controllable object (such as object 90) which has been generated by the target application.

Figure 2:
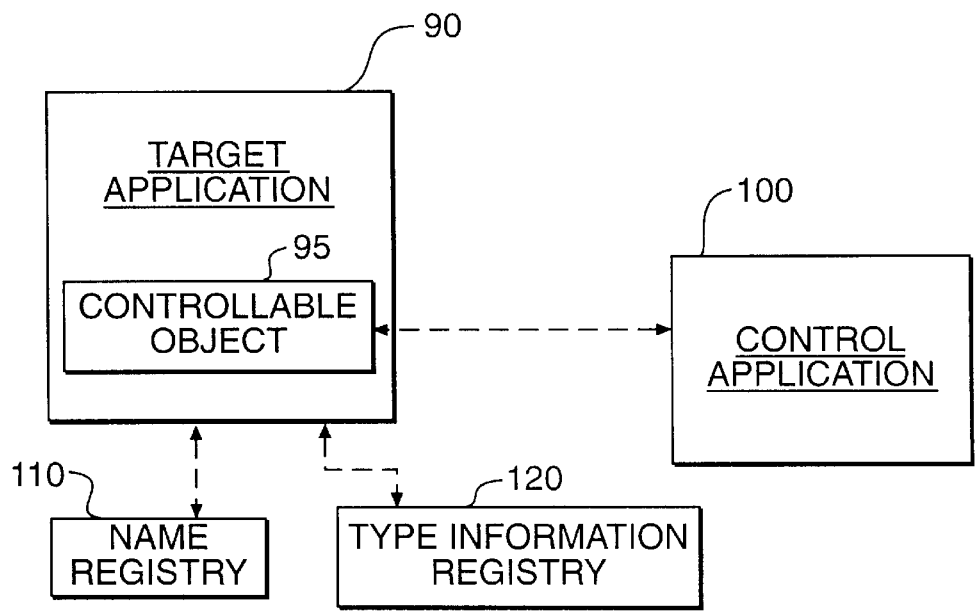
FIG. 2 is a block diagram illustrating the interaction between a target application and a control application implementing the present invention.

In order to acquire a reference or handle to a controllable object, the control application preferably interrogates a name registry 110 (stored in the memory 30 or run as a separate application; see FIG. 2) to find an object reference if that reference was not provided by the user or agent. The control application also includes commands to interrogate a type information registry 120 (also stored in memory 30 or run as another separate application) to ascertain the object type (i.e. controllable or not controllable) of objects whose references have been retrieved. The object type will indicate whether the object is a controllable object, in which case a control application be used as described herein. (For a similar setup, see application's aforementioned copending patent application, with respect to FIG. 3 and the discussion at pages 15–16.)

Thus, acquiring a handle can be accomplished in a number of ways, including by the target application publishing the names of its controllable objects, or by the user or agent being provided in advance with names of the controllable objects within the target application. Acquiring a handle includes determining that a controllable object actually exists with the name expected by the user or agent.

At box 680, the user or agent invokes the getControl function of the control application to obtain the control(s) of the controllable object. The getControl function is defined as in FIGS. 4C and 5A; it takes no argument, as indicated in FIG. 4C, and returns a list of controls of the controllable object(s). As indicated in FIG. 4C, there are two methods (i.e. object functions) provided by the object Controllable-Object 420; the second, setControl, is discussed below.

Figure 5A:
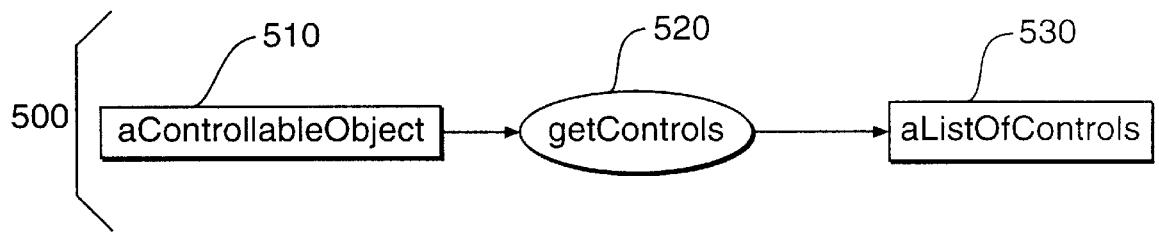
FIGS. 5A–5B show relationships among controls and objects of the invention.

As shown in FIG. 5A, the controllable object is operated on by the getControls function to return "aListOfControls" 530. Thus, the controllable object returns a list of available controls to the control application, as indicated at box 700 in FIG. 6B.

Other execution of the target application (e.g. of the controllable object) is carried out as indicated at box 710, while the method of the invention proceeds to box 720, where the list of controls is presented to the client, i.e. the agent or user of the control application. Each such control is defined as in data structure 400 shown in FIG. 4A, including a name and a value. The name might be "garbage_collection", while the value might be "75", indicating that garbage will be collected when memory is 75% utilized.

At box 730, the client can change a value of a control, and in general may change the state of the controllable object. For instance, a user may wish to set the garbage collection frequency by entering a value as discussed above, or may select a garbage collection strategy from a list of strategies, or may command the target application to collect garbage immediately.

For values, a data structure "Value" 330 is used, having a "tag" indicating the type of variable (which may be Range, Choice, Layout, integer, string, etc.) and a "value" of the type specified by the tag. In order to change the value of the control "garbage_collection_frequency", the user or agent invokes "setControl" on the controllable object. SetControl is defined as in FIGS. 4C and 5B.

FIG. 4C shows that the controllable object uses the setControl function by accepting the arguments "name" (which is a string) and an accompanying setting "s"; that is, the name of the control to be changed, and the setting to which they should be changed.

Figure 5B:
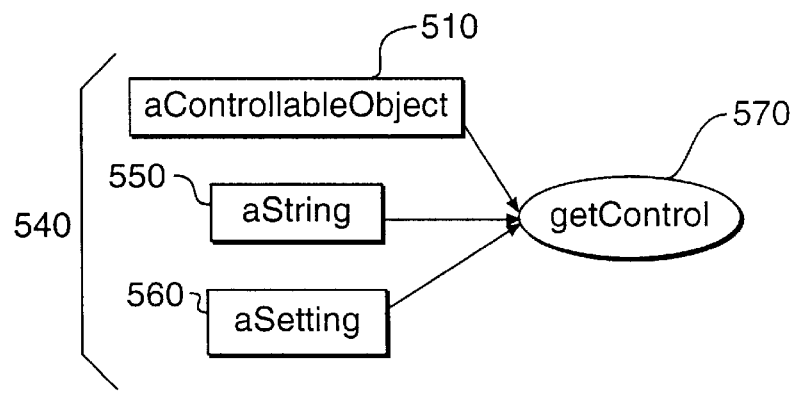

FIG. 5B shows that the SetControl function 570 operates on the controllable object 510, using the arguments "aString" 550 and "aSetting" 560 to change the value of the setting as desired. SetControl 570 does not return any values.

The Setting structure 410 is shown in FIG. 4B, and preferably resides in the control application (but may reside elsewhere, depending upon the interface provided). The tag indicates the type of data (i.e. type of acceptable value), and the value is set as desired by the user or agent, matching the indicated type.

If a list of values is to be made available as a control, a data structure 310 defining choices (see FIG. 3B) is preferably used. In this case, the type for "Value" is "Choice" (see FIG. 4D). Here, the data structure Choice includes "choices", which is a string array indicating the choices of settings available to the user, and the "current" value, which denotes the current choice and may be an integer value, another string value, or another desired data type. (If the value is of integer type, it may be an index into the string array listing the choices.)

If a range is presented to the user, the Range structure 300 (see FIG. 3A) is used. Here, the user selects a range of values, identified by the upper and lower bounds, which are named by string variables and take values that are integers (or may be other numerical data types, e.g. floating point). The current value (which is the same type as the bounds) is also available.

The control object may include in the list of controls presented to the user or agent one or more layout options, which will affect how the information is displayed on a monitor or otherwise displayed or printed. Preferably, a graphical user interface (GUI) is used, and the value of "Layout" (see FIG. 3C) at a given point in the interaction between the control application and the controllable object will indicate where the current information is to be displayed. For instance, first a value (begin_box) indicating the beginning of a GUI box may be set, then a value is specified for display, followed by another value of Layout indicating that the next value should be displayed on the "next_row", followed then by the next value, and finally the "end_box" value indicates the end of that box. Either menus or "radio buttons" may alternatively be used to display the selectable parameters and/or their values, as desired.

At box 740 the method setControl is invoked on the controllable object, causing the user-or agent-selected value(s) to be passed to the controllable object. This is indicated at box 750.

The selected value(s) are then passed to the controllable object, as indicated at box 760, and the state of the target application is changed accordingly (box 770). Other execution of the target application is carried out as needed (box 780), while the control program remains in the loop formed by boxes 730–770 as long as the user or agent continues to alter values and send them to the controllable object.

Given the foregoing teaching, it is a straightforward matter to code for data structures and controllable objects as described, which allow a great variety of interaction with and control of target applications by a user or agent, to debug, optimize, and otherwise manipulate executing applications. Examples of uses of controllable objects include: to use a control to drive a target application to go through its execution frame-by-frame; to create an agent to automatically schedule events on a calendar that are specified in an email; to shut down an operating system's microkernel whenever desired, e.g. when some portion of the system is out of control or for installing new kernel software; to select depth-first or breadth-first as the mode of search in a hierarchically oriented data set; or in any other situation where minute, high-resolution control of a target application is desired.

What is claimed is:

1. A method for controlling predefined attributes of an application stored in a memory and executed by a processor coupled to the memory, including the steps of:
   (1) generating a controllable object by executing code in the application, the controllable object including at least one control having a control name and a control value and further including at least a first object function for getting said at least one control and a second object function for setting said at least one control; and
   (2) executing a predefined control program separate from the application, including the steps of:
      (2.1) establishing a communications link with the controllable object by interrogating a name registry to obtain an object reference and interrogating a type information registry, which lists objects of the application which are controllable, to obtain a type of the obtained object reference;
      (2.2) invoking the first object function on the controllable object to retrieve a list including said at least one control;
      (2.3) invoking the second object function on the controllable object based upon a user-determined input; and
      (2.4) setting an internal state of the controllable object based upon said user-determined input.

2. The method of claim 1, wherein said at least one control includes an action to be taken by the controllable object.

3. The method of claim 1, wherein said at least one control includes a value set by the user for use by the controllable object.

4. The method of claim 1, wherein said at least one control includes a plurality of choices presented to the user for selection of one choice to be communicated to the controllable object.

5. The method of claim 1, wherein said at least one control includes a range of values to be communicated to the controllable object.

6. A controllable object which is controllable in a computer system having a processor and a memory coupled to the processor, the memory including an application executable by the processor, the controllable object being created by code in the application and stored in the memory in conjunction with the application and including:
   at least one predefined control including a name and a value;
   a first object function for providing a controls list including said at least one predefined control to a control program executable on said processor, said processor including a name registry storing object names and a type information registry which lists objects of the application which are controllable, and said control program being separate from the application, said control program using said name registry and said type information registry to communicate with the controllable object; and
   a second object function for receiving a name and at least one setting from said control program, for setting an internal state of a predefined control corresponding to the received name based upon a value of said setting.

7. A method for controlling a target application including a controllable object comprising at least one object control having a control name and a control value, the target application being executable by a processor of a computer system, the computer system having a memory coupled to the processor and storing said application, a user output device coupled to the microprocessor and a user input device coupled to the microprocessor, the method being executed by a control program stored in said memory separate from the target application and executed on said processor, the method including the steps of:
   (1) establishing a communications link with the controllable object by interrogating a name registry to obtain an object reference and interrogating a type information registry, which lists objects of the application which are controllable, to obtain a type of the obtained object reference;
   (2) acquiring a control value of one of the at least one object control;
   (3) outputting to the user output device a representation of the acquired value;
   (4) receiving user input of a change to the acquired value;

(5) sending the change to the acquired value to the controllable object; and (6) changing the control value in accordance with the change to the acquired value.

8. The method of claim 7, wherein step 1 is carried out by executing a control function of the controllable object.

9. The method of claim 8, including, before step 3, the step of providing the user with a plurality of choices of values with one value to be selected, wherein step 3 includes the step of receiving the user's selection of said one value.

10. A system for executing predefined functions of a target application executable on a processor of a computer and stored in a memory coupled to the processor, the computer having an input device and an output device coupled to the processor, the system comprising:

a control program stored in said memory and executable by said processor;

a predefined controllable object of said target application including at least one predefined control, a first object function for providing a list of controls of said controllable object to said control program, and a second object function for receiving names of said controls and input values from said control program;

a name registry having a list of object references;

a type information registry which lists objects of the application which are controllable;

said control program being separate from said target application and including instructions for establishing a communications link with the controllable object by interrogating the name registry to obtain an object reference and interrogating the type information registry to obtain a type of the obtained object reference, instructions for displaying on the output device said list of controls, and further including instructions for receiving a user input via the input device, the user input comprising said input values, the control program further including instructions for transmitting said names of the controls and input values to said controllable object;

wherein the second object function includes instructions for altering values identified by said names for executing the target application in accordance with said altered values.

* * * * *